Figures 1, 2:
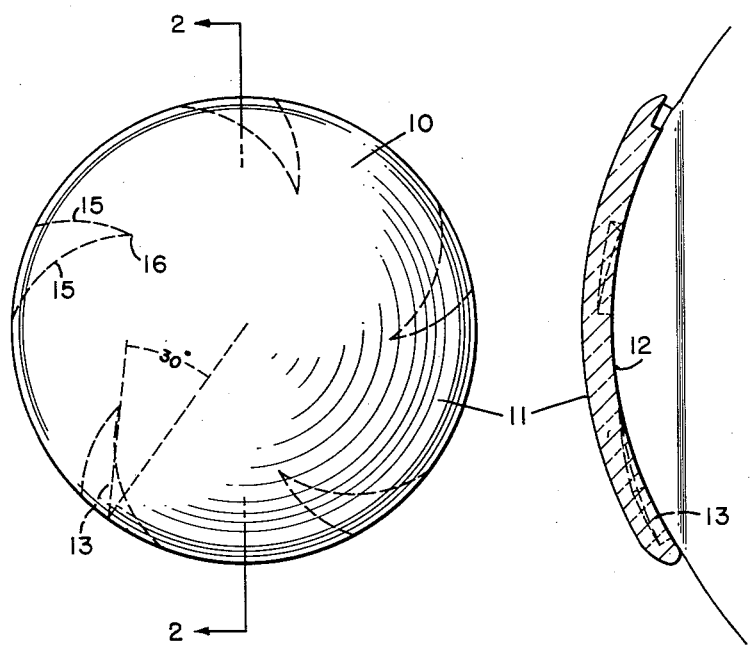

June 27, 1961  S. GORDON  2,989,894
CORNEAL CONTACT LENS WITH SPIRAL VENT DUCTS

Filed June 22, 1959

*INVENTOR.*
STANLEY GORDON
BY Cumpston & Shaw

HIS ATTORNEYS

United States Patent Office 2,989,894
Patented June 27, 1961

2,989,894
CORNEAL CONTACT LENS WITH SPIRAL VENT DUCTS
Stanley Gordon, Brighton, N.Y., assignor to Contact Lens Guild Inc., Rochester, N.Y., a corporation of New York
Filed June 22, 1959, Ser. No. 822,154
1 Claim. (Cl. 88—54.5)

This invention relates to ophthalmic lenses of the corneal contact type adapted to be fitted to the corneal surface of the eye inside the limbal area. It is important that such lenses be constructed in a way to accommodate the respiration and metabolism requirements of the corneal surface including the supply of the lachrymal fluid secreted by the lachrymal glands and swept over the surface of the eye by the muscular movements of blinking. Attempts have been made to provide such a construction, as by employing a curvature for the inner central surface portion of the lens having a longer radius than the outer surface of the cornea, so that the flatter lens is rocked on the cornea during blinking, but this has tended to cause the cornea to assume the same curvature as that of the lens and to disadvantageously alter and distort the shape of the cornea.

Another attempted provision has been to give to the periphery of the inner surface of the lens a radius longer than that of the periphery of the cornea so that the edge of the lens is out of contact with it, but this has had the disadvantage that the cornea has tended to assume this shape with resulting distortion.

Another attempted provision has been to form the inner surface of a non-rotary lens with radial ducts or channels to conduct the lachrymal fluid to the center of the cornea. This arrangement, however, has had the effect of causing the cornea to expand into and partially fill such ducts, with corresponding distortion of the cornea surface. Still another attempt has been to provide elevations on the inside surface of the lens to raise such surface slightly off the cornea, but such elevations have been found to dig into the cornea, allowing the lens to fit closely on it and interfere with the distribution of the lachrymal fluid.

The effects of these prior modes of construction have proven undesirable in that their initial value has been eventually seriously reduced or eliminated with continued lens wear because of undesirable change in the cornea from its natural and true shape. Thus it has been a common experience for persons who have been fitted with and have worn such lenses that while they may seem comfortable for a short period of, say, a year, they have found it desirable after a longer time to have such lenses refitted for comfortable and efficient operation.

One object of the invention, therefore, is to provide an improved contact lens so constructed as to provide for an ample and continuous distribution of lachrymal fluid without alteration of the surface of the cornea.

Another object is to provide a lens of the above nature so constructed as to produce a slow but continuous movement of the lens on the cornea so as to counteract any tendency of the latter to conform to the inner surface of the lens and thus violate its normal curvature, since any change from normal shape is obviously undesirable.

A further object is the provision of such a lens having a slow but continuous rotary motion on the cornea to counteract any deformation of its surface and to maintain the constant supply thereto of an ample quantity of the lachrymal fluid.

To these and other ends the invention resides in certain improvements and combinations of parts, all as will be hereinafter more fully described, the novel features being pointed out in the claims at the end of the specification.

In the drawings:
FIG. 1 is a front or outside elevation of a lens embodying the present invention, and
FIG. 2 is a sectional elevation on the line 2—2 in FIG. 1.

The invention is embodied in the present instance, by way of illustration, in a contact lens 10 of generally concavo-convex shape, as shown, and made of glass or a known and suitable transparent, chemically inert, plastic material, such, for example, as methyl methacrylate, as well understood in the art. The lens is relatively thin having a thickness between say, 0.15 and 0.2 mm., with a diameter slightly less than the outline of the corneal surface, as, for example, one to four millimeters, so as to avoid contact with the limbal area. The front or outer surface 11 may have any suitable prescription curvature, while the inner surface 12 is preferably given substantially the same curvature as the outer surface of the cornea.

I have found that the above objects are satisfactorily accomplished by providing the inner surface 12 of the lens with a plurality, say, five, of equally spaced ducts 13 formed in the inner surface only of the lens and each opening inwardly from a base in the perimeter of substantial width and depth to facilitate the ready entrance of lachrymal fluid flowing toward the inner canthus of each eye. These ducts are of decreasing width and depth inwardly of the lens, each having opposite sides 15 curving and converging to a point 16 outside the optical zone of the eye, so as to avoid interference therewith, while providing effective distribution of the lachrymal fluid to the central portion of the cornea.

An important novelty of the ducts 13 is that they do not extend in radial directions toward the center of the cornea, but all extend in the same direction in each lens disposed spirally around the center of the cornea. The drawing shows a lens for the left eye, with ducts spirally inclined to produce clockwise rotation as viewed in FIG. 1 and conform with and promote the natural flow of the lachrymal fluid from the outer corner toward the nose, the spiral direction being reversed for similar functions in a lens for the right eye. The effect of this spirally extending direction of the ducts is to produce a slow but progressive or continuous rotation of the lens about the center of the cornea, under the anatomical structure of the lid and the normal muscular blinking actions of the eyelids and to produce the normal flow of eye fluid, with the result of acomplishing several important functions.

One advantageous function is that the ducts do not remain over the same portion or portions of the cornea long enough to allow the cornea to expand into the ducts and so alter its natural and true shape. Another advantage is that the full efficiency of the ducts is maintained since there is no tendency of the cornea to expand into and block the passages through the ducts. Still a further advantage is that the slow and constant rotation of the lens serves to prevent the excess settling of the lens on the cornea, so that there is always sufficient space between the lens and cornea for an adequate layer of lachrymal fluid to insure maintenance of the desired respiratory and metabolic processes.

My invention thus accomplishes in a satisfactory and efficient way the preservation of the natural processes of the cornea, while avoiding any interference with or distortion of its natural and true shape, during continuous comfortable wearing of the lenses over long periods of time, with a minimum of subsequent fitting to preserve the desired comfort and ophthalmic correction.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claim.

The instant application comprises a continuation-in-part of my prior copending application Serial No. 751,951, filed July 30, 1958, for "Contact Lens," now abandoned.

I claim:

A corneal contact lens of generally concavo-convex form having a diameter slightly less than that of the corneal portion of the eye to substantially cover the same without contacting the limbal area or sclera of the eye, the concave surface of said lens having a curvature conforming substantially to the natural curvature of the cornea, the inner concave surface of said lens being grooved to form a plurality of equally spaced ducts of generally elongated, spirally curved, tapered configuration extending from the periphery of said lens toward the center thereof, the curvature of said ducts corresponding substantially to the directionality of normal lachrymal flow in said eye whereby said ducts effect accelerated turning moments on said lens thereby to produce continual rotation of said lens at an accelerated rate and in a single direction for a given eye, said ducts being depressed in said concave surface and terminating, in depth, at the lens edge within the body thickness of said lens so as not to impinge on the convex side of said lens, each of said ducts having a relatively wide base adjacent the peripheral edge of said lens defining an arcuate opening substantially conforming to the peripheral edge of said lens for the entry of eye fluid, the arcuate open bases of said plurality of ducts being equally spaced from one another by ungrooved portions of said concave lens surface along the peripheral edge of said lens, the two sides of each said duct being of curved configuration, curved in the same direction relative to one another, and extending from the opposed edges of said arcuate opening in increasing proximity to one another to terminate said duct between the periphery and center of said lens at a location sufficiently distant from the center of said lens so as to avoid interference with vision through the central optical zone of said lens, each of said ducts tapering not only in width but also in depth between said relatively wide base opening and said terminating duct location, each of said ducts being deepest at its base and substantially smoothly merging into said concave surface of said lens at said terminating location, the terminating location of each said duct being angularly displaced from the center point of the duct base in such manner that an acute angle of substantially 30° is described between a lens radius passing through said duct base center point and a line passing from said duct base center point through said terminating duct location, the directionality of curvature for each duct, when each said duct is disposed during rotation adjacent the upper outer portion of an eye, extending generally downward and inwardly from a location adjacent the upper outer corner of the eye toward the inner lower corner of said eye, a pair of said lenses thus having their associated ducts curving in opposing directions in conformity with the opposite directions of normal lachrymal flow in a pair of eyes thereby to effect said continual accelerated rotation of said lenses in a counter-clockwise direction in the right eye, and in a clockwise direction in the left eye, as observed from the outer convex sides of said lenses.

References Cited in the file of this patent

FOREIGN PATENTS

| | | |
|---|---|---|
| 832,951 | Germany | Mar. 3, 1952 |
| 868,225 | Germany | Feb. 23, 1953 |

OTHER REFERENCES

"The Vent-Air Corneal Lens," Lewison et al., article in "The Optical Journal and Review of Optometry," vol. XCII, No. 7, April 1, 1955, pgs. 34 and 41 cited.